(12) United States Patent
White

(10) Patent No.: US 10,911,900 B1
(45) Date of Patent: Feb. 2, 2021

(54) MULTIPLE OBJECT LOCATION ASSEMBLY

(71) Applicant: Michael White, Nashville, TN (US)

(72) Inventor: Michael White, Nashville, TN (US)

( * ) Notice: Subject to any disclaimer, the term of this patent is extended or adjusted under 35 U.S.C. 154(b) by 0 days.

(21) Appl. No.: 16/553,849

(22) Filed: Aug. 28, 2019

(51) Int. Cl.
*G08B 21/02* (2006.01)
*H04W 4/029* (2018.01)
(Continued)

(52) U.S. Cl.
CPC ............... *H04W 4/029* (2018.02); *G06F 3/02* (2013.01); *G06F 3/14* (2013.01); *G08B 7/06* (2013.01); *H04B 1/385* (2013.01); *H04W 4/023* (2013.01)

(58) Field of Classification Search
CPC ........ G06F 3/013; G06F 3/012; G06F 3/0304; G06F 3/017; G06F 3/014; G06F 21/316; G06F 21/32; G06F 21/64; G06F 2203/011; G06F 3/011; G06F 3/0346; G06F 3/04817; G06F 3/0482; G06F 3/005; G06F 3/044; G06F 3/04815; G06F 3/0488; G06F 3/04883; G06T 19/006; G06T 7/00; G06T 11/20; G06T 19/003; G06T 2200/24; G06T 7/0012; G06T 7/20; G06T 13/40; G06T 17/05; G06T 19/20; G06T 2207/10021; G06T 2207/30196; G06T 3/4038; G06T 7/246; G06T 7/292; G06T 7/75; G06T 7/85; G02B 2027/0138; G02B 27/0172; G02B 2027/014; G02B 27/0093; G02B 2027/0178; G02B 27/017; G02B 2027/0181; G02B 27/01; G02B 27/0179; G02B 6/0076; A63F 13/212; A63F 2300/1012; A63F 2300/205; A63F 13/213; A63F 13/216; A63F 13/65; A63F 13/02; A63F 13/211; A63F 13/24; A63F 13/422; A63F 13/428; A63F 13/55; A63F 13/79; A63F 2300/203; A63F 2300/301; A63F 2300/303; A63F 2300/6676; A63F 13/35; A63F 13/69; A63F 2300/1087; A63F 2300/5526; A63F 2300/69; H04N 5/225; H04N 5/23229; H04N 5/247;
(Continued)

(56) References Cited

U.S. PATENT DOCUMENTS 5,389,915 A 2/1995 Chen
5,714,932 A * 2/1998 Castellon ........... G08B 21/0227
340/539.11
(Continued)

*Primary Examiner* — Daniel Previl

(57) ABSTRACT

A multiple object location assembly includes a tracking unit that is wearable on a user. The tracking unit has a plurality of communication channels that is each programmable to have a distance alarm is set to a pre-determined trigger distance. A plurality of transmitting units is provided and each of the transmitting units broadcasts a tracking signal to the tracking unit. each of the transmitting units is coupled to a respective one of a plurality of objects and the tracking signal broadcast by each of the transmitting units is associated with the respective object. Each of the transmitting units is assigned to a respective one of the communication channels in the tracking unit. Moreover, the distance alarm in a respective one of the communication channels is turned on when the transmitter assigned to the respective communication channel moves beyond the pre-determined trigger distance from the tracking unit.

17 Claims, 3 Drawing Sheets

(51) Int. Cl.
*G06F 3/14* (2006.01)
*G08B 7/06* (2006.01)
*H04W 4/02* (2018.01)
*H04B 1/3827* (2015.01)
*G06F 3/02* (2006.01)

(58) Field of Classification Search
CPC ......... H04N 5/44504; H04N 21/25841; H04N 21/2662; H04N 21/2668; H04N 21/41422; H04N 21/615; H04N 21/8126; H04N 13/117; H04W 4/029; H04W 4/02; H04W 12/06; H04W 12/0605; H04W 4/02; H04W 4/021; A61B 5/681; A61B 2503/04; A61B 2503/06; A61B 2560/0412; A61B 2562/166; A61B 5/0205; A61B 2017/00203; A61B 2017/00207; A61B 2017/00216; A61B 2034/2048; A61B 2034/254; A61B 2034/258; A61B 2090/365; A61B 2090/367; A61B 2090/368; A61B 2090/371; A61B 2090/372; A61B 2090/378; A61B 2090/502; A61B 2560/0214; A61B 2560/0242; A61B 2560/0252; A61B 2560/0257; A61B 2560/0219; A61B 2562/029; A61B 2562/06; A61B 34/25; A61B 5/0002; A61B 5/0022; A61B 5/01; A61B 5/02055; A61B 5/021; A61B 5/02438; A61B 5/029; A61B 5/0402; A61B 5/0816; A61B 5/1112; A61B 5/1113; A61B 5/1118; A61B 5/14532; A61B 5/14542; A61B 5/14551; A61B 5/4088; A61B 5/6803; A61B 5/6804; A61B 5/6822; A61B 5/6829; A61B 5/686; A61B 5/7267; A61B 5/7275; A61B 5/7435; A61B 90/36; A61B 90/37; G06K 9/00604; G06K 9/0061; G06K 9/00617; G06K 9/00201; G06K 9/00221; G06K 9/00597; G06K 9/00335; G06K 9/52; G06K 2209/01; G06K 9/00302; G06K 9/00342; G06K 9/00362; G06K 9/00664; G06K 9/00671; G06K 9/00744; G16H 50/20; G16H 10/60; G16H 40/63; G16H 50/30; G16H 40/67; H04L 63/0861; H04L 65/1089; H04L 65/403; H04L 65/4053; H04L 67/22; H04L 67/26; H04L 67/38; G01C 21/206; G01S 19/46; G01S 5/0036; G01S 5/0054; G01S 5/0081; G01S 5/021; G01S 5/0215; G01S 5/0221; G01S 5/14; G01S 5/145; H04M 2250/10; H04M 3/44; H04M 7/006; A63B 24/0062; G08B 21/0288; G08B 21/0211; G08B 21/0227; G08B 21/0247; G08B 21/0263; G08B 21/0266; G08B 21/0269; G08B 21/0272; G08B 21/0286; B60K 35/00; G06N 20/00; G06Q 20/047; G06Q 20/0655; G06Q 20/3224; G06Q 20/3276; G06Q 30/0601; G08C 17/02; H02J 7/025; H04B 1/385; H05K 1/0278; H05K 5/0086
USPC ....... 340/539.13, 573.1, 572.1–572.9, 691.6, 340/825.06, 686.1, 870.07
See application file for complete search history.

(56) References Cited

U.S. PATENT DOCUMENTS

| | | | |
|---|---|---|---|
| 5,900,817 A | 5/1999 | Olmassakian | |
| 5,995,007 A * | 11/1999 | Borja | G08B 21/0288 340/539.1 |
| 6,850,773 B1 * | 2/2005 | Ghassabian | G04G 21/04 379/433.1 |
| 7,848,905 B2 * | 12/2010 | Troxler | G08B 21/023 702/187 |
| 10,229,573 B1 * | 3/2019 | Lawrie | G08B 21/0247 |
| 2014/0285340 A1 | 9/2014 | Campas | |
| 2017/0103635 A1 | 4/2017 | Kroll | |
| 2020/0006988 A1 * | 1/2020 | Leabman | H02J 50/20 |

\* cited by examiner

MULTIPLE OBJECT LOCATION ASSEMBLY

The disclosure and prior art relates to location devices and more particularly pertains to a new location device for emitting an alert when user moves beyond a pre-determined distance from a selected object.

BRIEF SUMMARY OF THE INVENTION

An embodiment of the disclosure meets the needs presented above by generally comprising a tracking unit that is wearable on a user. The tracking unit has a plurality of communication channels that is each programmable to have a distance alarm is set to a pre-determined trigger distance. A plurality of transmitting units is provided and each of the transmitting units broadcasts a tracking signal to the tracking unit. each of the transmitting units is coupled to a respective one of a plurality of objects and the tracking signal broadcast by each of the transmitting units is associated with the respective object. Each of the transmitting units is assigned to a respective one of the communication channels in the tracking unit. Moreover, the distance alarm in a respective one of the communication channels is turned on when the transmitter assigned to the respective communication channel moves beyond the pre-determined trigger distance from the tracking unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
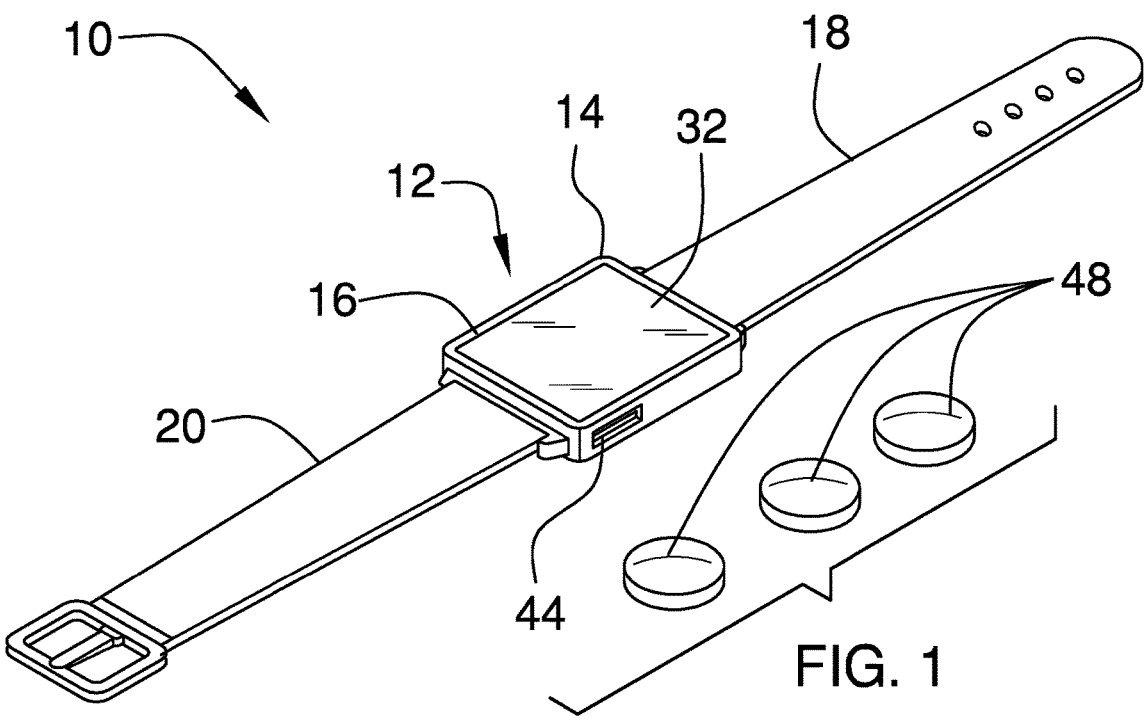
FIG. 1 is a perspective view of a multiple object location assembly according to an embodiment of the disclosure.
Figure 2:
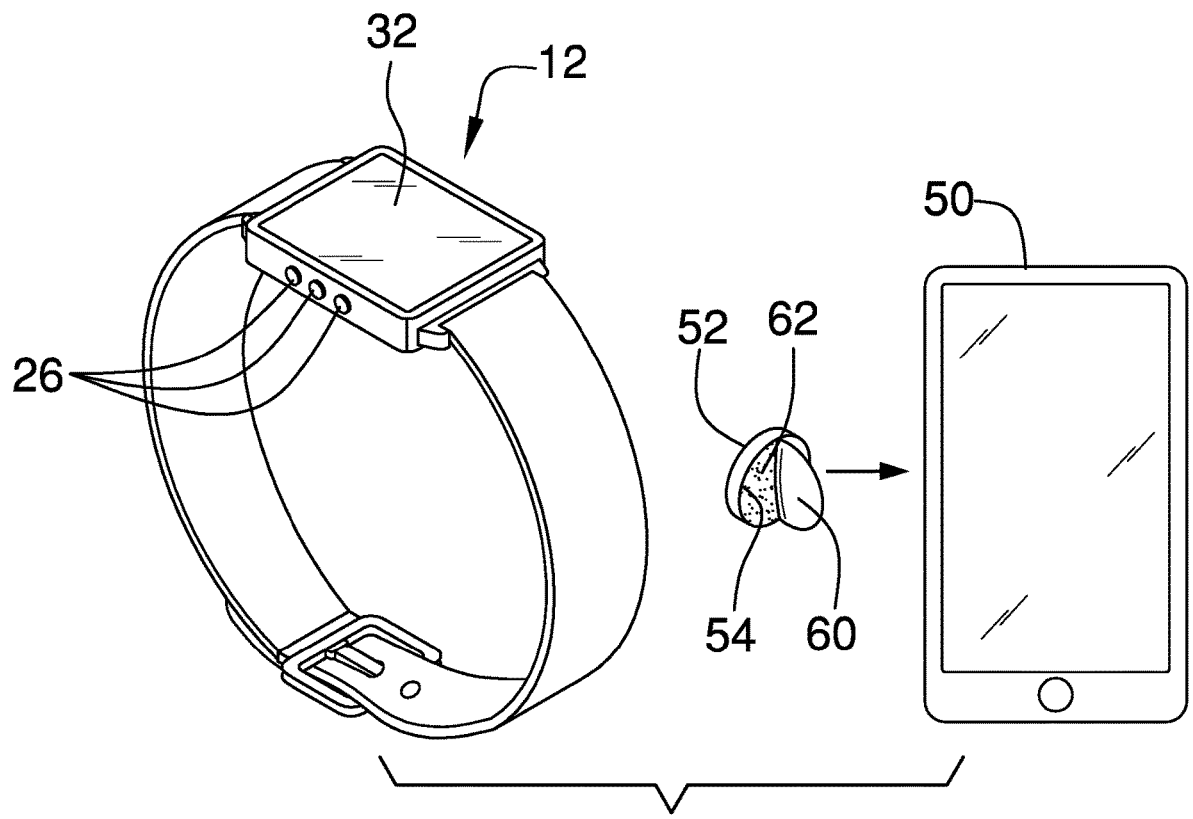
FIG. 2 is a front perspective view of an embodiment of the disclosure.
Figure 3:
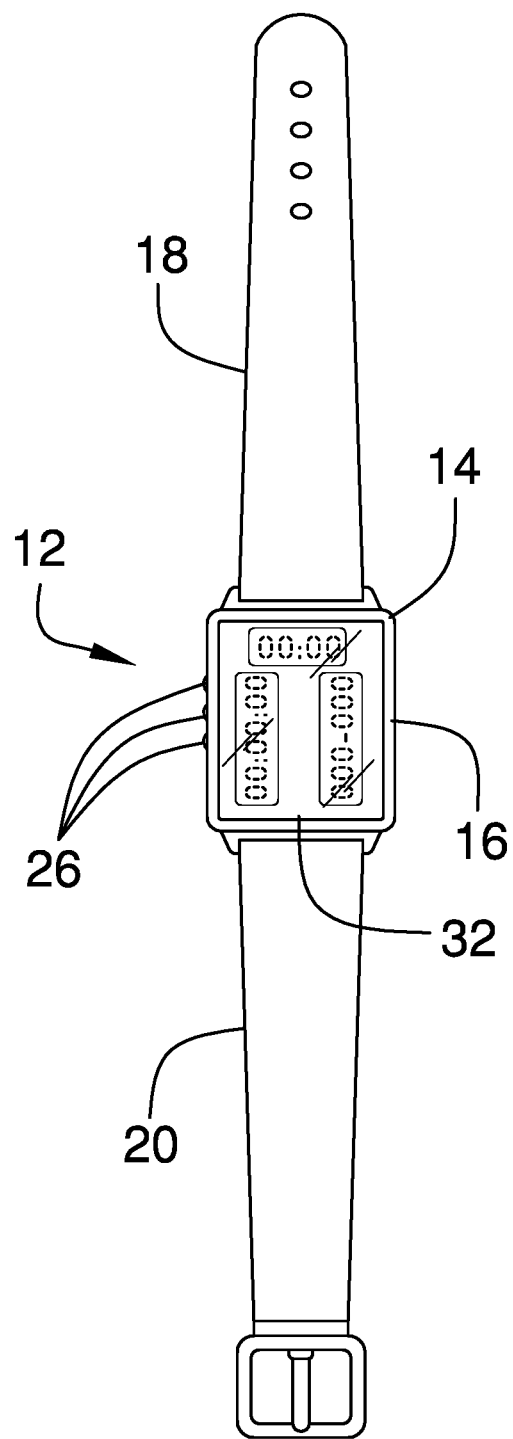
FIG. 3 is a top view of a tracking unit of an embodiment of the disclosure.
Figure 4:
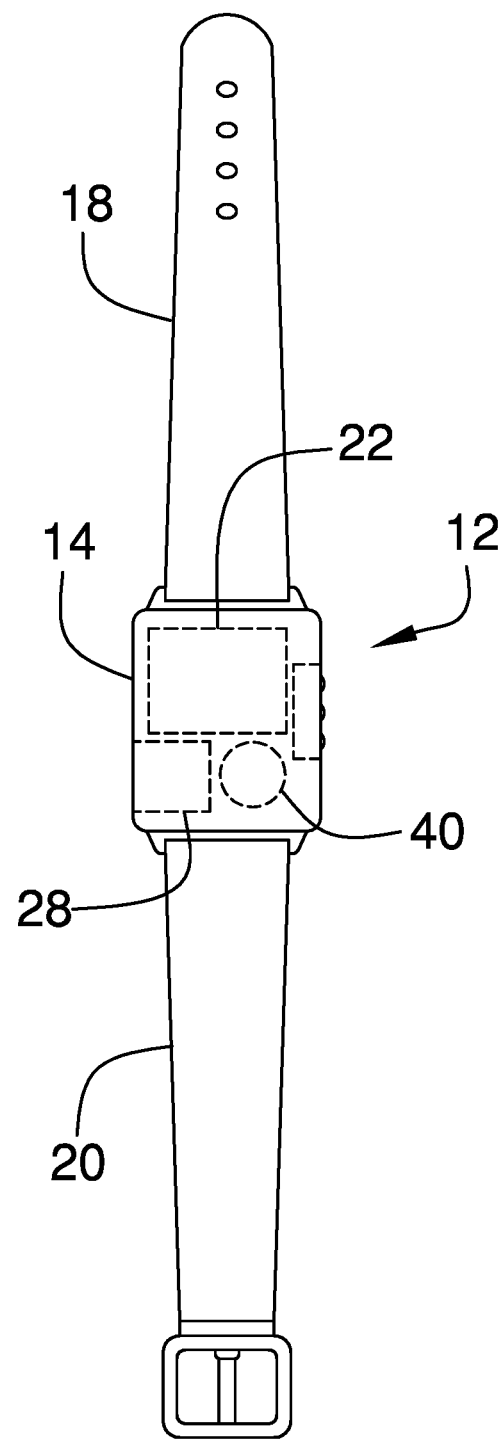
FIG. 4 is a bottom phantom view of a tracking unit of an embodiment of the disclosure.
Figure 5:
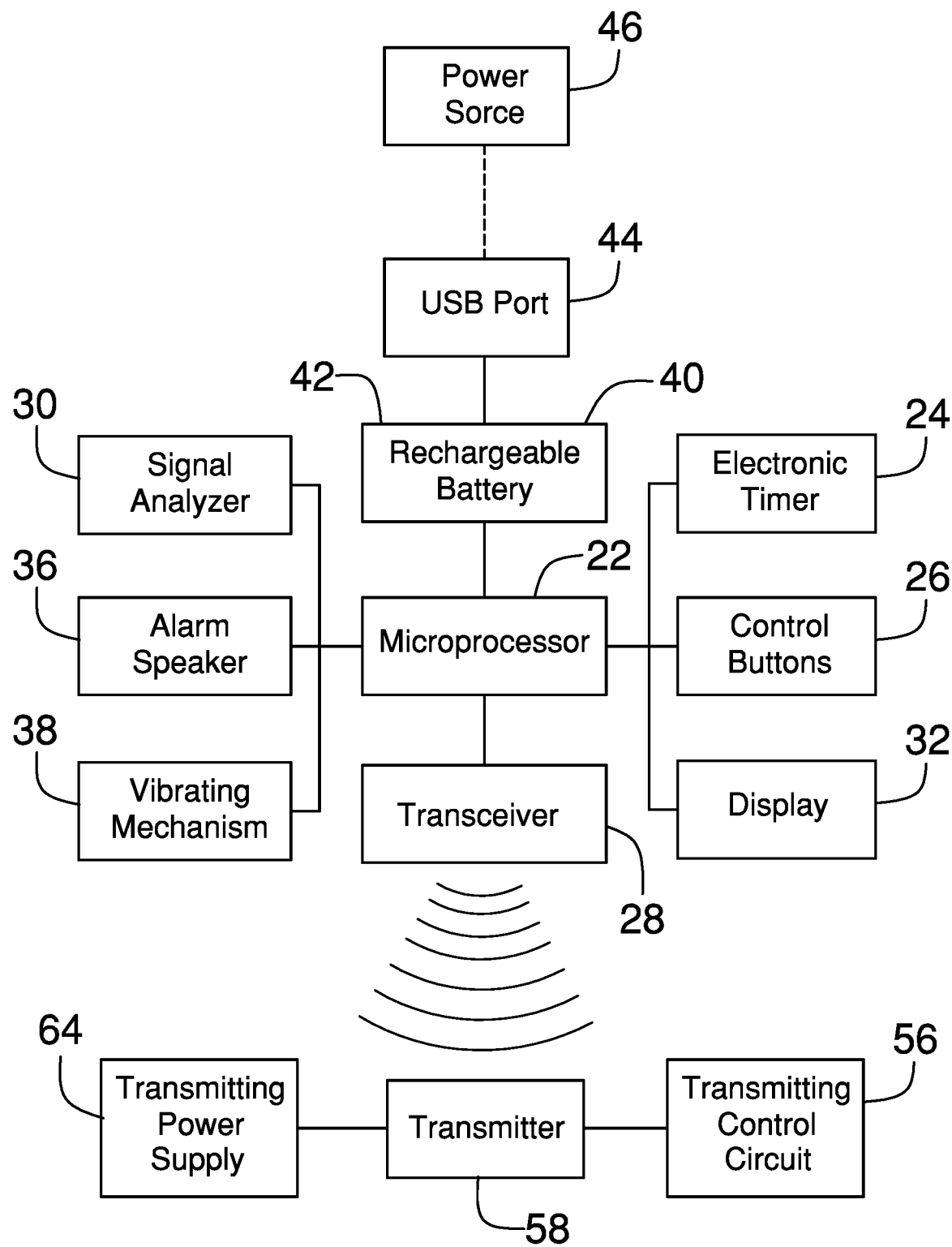
FIG. 5 is a schematic view of an embodiment of the disclosure.

With reference now to the drawings, and in particular to FIGS. 1 through 5 thereof, a new location device embodying the principles and concepts of an embodiment of the disclosure and generally designated by the reference numeral 10 will be described.

As best illustrated in FIGS. 1 through 5, the multiple object location assembly 10 generally comprises a tracking unit 12 that is wearable on a user. The tracking unit 12 has a plurality of communication channels and each of the communication channels is programmable to have a distance alarm set to a pre-determined trigger distance. Each of the communication channels has a time alarm that can be set to a pre-determined time of day. Additionally, each of the communication channels has a routine alarm the can be set for a pre-determined routine.

The tracking unit 12 comprises a housing 14 has a top wall 16, a first strap 18 coupled to and extending away from the housing 14 and a second strap 20 coupled to and extending away from the housing 14. The second strap 20 is matable to the first strap 18 such that the first strap 18 and the second strap 20 form a closed loop that has an adjustable diameter. In this way the first strap 18 and the second strap 20 can retain the housing 14 around the user's wrist. The second strap 20 may include a fastener which may comprise, but not be limited to, a buckle, a clasp or any other type of releasable fastener. The first strap 18 may include a plurality of engagements which may comprise, but not be limited to, a plurality of apertures in the first strap 18 that the buckle can engage, a plurality of hooks that the clasp can engage or any other type of engagement.

The tracking unit 12 includes a control circuit 22 that is positioned within the housing 14. The control circuit 22 receives a distance input, a time input and a routine input. The tracking unit 12 includes an electronic timer 24 that is positioned within the housing 14. The electronic timer 24 is electrically coupled to the control circuit 22 and the electronic timer 24 tracks the time of day.

The tracking unit 12 includes a plurality of programming buttons 26 that is each movably coupled to the housing 14. Each of the programming buttons 26 is electrically coupled to the control circuit 22. Moreover, each of the programming buttons 26 programs a respective one of the trigger distance, the pre-determined time of day and the pre-determined routine. The control circuit 22 receives the time input when the electronic timer 24 reaches a time of day that corresponds to the pre-determined time of day programmed with the respective programming button 26.

The tracking unit 12 includes a transceiver 28 that is positioned within the housing 14 and the transceiver 28 is electrically coupled to the control circuit 22. The transceiver 28 is capable of receiving a plurality of tracking signals that are each on a discrete frequency from one another. The transceiver 28 may be a multiple channel, radio frequency transceiver or the like. The tracking unit 12 includes a signal analyzer 30 that is positioned within the housing 14 and the signal analyzer 30 is electrically coupled to the control circuit 22. The signal analyzer 30 determines a distance over which each of the tracking signals has been broadcast to the transceiver 28. The control circuit 22 receives the distance input when the signal analyzer 30 determines that any of the tracking signals has been broadcast over a distance that exceeds the pre-determined distance programmed by respective programming button 26. The signal analyzer 30 may be an electronic signal analyzer of any conventional design that is capable of determining the signal strength of a radio frequency signal.

The tracking unit 12 includes a display 32 that is coupled to the top wall 16 of the housing 14 such that the display 32 is visible to a user. The display 32 is electrically coupled to the control circuit 22. The display 32 displays indicia 34 comprising numbers to indicate the pre-determined trigger distance programmed by the respective programming button. Additionally, the indicia 34 comprise numbers to indicate the pre-determined time of day programmed by the respective programming button. The indicia 34 comprise letters and number to indicate the pre-determined routine programmed by the respective programming button.

A speaker 36 is coupled to the housing 14 and the speaker 36 emits an audible alarm outwardly therefrom. The speaker 36 is electrically coupled to the control circuit 22 and the speaker 36 is turned on when the control circuit 22 receives any of the distance input, the time input or the routine input. The speaker 36 may be an electronic speaker 36 of any conventional design.

A vibration unit 38 is coupled to the housing 14 such that the vibration unit 38 is in mechanical communication with the housing 14. The vibration unit 38 is electrically coupled to the control circuit 22. The vibration unit 38 vibrates the housing 14 when the vibration unit 38 is turned on. In this way the vibration unit 38 facilitates a haptic alert for the user. Moreover, the vibration unit 38 is turned on when the control circuit 22 receives any of the distance input, the time input of the routine input. The vibration unit 38 may comprise, but not be limited to, an electric motor and a cam that is rotatably coupled to the electric motor, and the cam may alternatively engage the housing 14 when the electric motor is turned on.

A power supply 40 is coupled to the housing 14 and the power supply 40 is electrically coupled to the control circuit 22. The power supply 40 comprises at least one rechargeable battery 42 that is positioned within the housing 14. The at least one rechargeable battery 42 is electrically coupled to the control circuit 22. The power supply 40 includes a charge port 44 that is recessed into the housing 14. The charge port 44 is electrically coupled to the at least one rechargeable battery 42 and the charge port 44 can electrically coupled to a power source 46 for charging the at least one rechargeable battery 42. The charge port 44 may be a usb port, a micro usb port or any other female port and the power source 46 may be a usb cord, a micro usb or other type of male charging cord.

A plurality of transmitting units 48 is provided and each of the transmitting units 48 broadcasts a tracking signal to the tracking unit 12. Each of the transmitting units 48 is coupled to a respective one of a plurality of objects 50. In this way the tracking signal broadcast by each of the transmitting units 48 is associated with the respective object 50. The plurality of objects 50 may include a smart phone, a set of keys, a medication bottle, a wallet or any object that is commonly carried by the user.

Each of the transmitting units 48 is assigned to a respective one of the communication channels in the tracking unit 12. The distance alarm in a respective one of the communication channels is turned on when the transmitter 58 assigned to the respective communication channel moves beyond the pre-determined trigger distance from the tracking unit 12. The time alarm in a respective one of the communication channels is turned on at the pre-determined time of day assigned to a respective one of the transmitting units 48. The routine alarm in a respective one of the communication channels is turned on at the pre-determined routine assigned to a respective one of the transmitting units 48.

Each of the transmitting units 48 comprises a disk 52 that is positionable on the respective object 50 and the disk 52 has a first surface 54. A transmitting control circuit 56 is positioned within the disk 52 and a transmitter 58 is positioned within the disk 52. The transmitter 58 is electrically coupled to the transmitting control circuit 56 and the transmitter 58 continuously broadcasts the tracking signal to the transceiver 28 in the tracking unit 12. Additionally, the tracking signal broadcast by the transmitter 58 in each of the transmitting units 48 is broadcast on a discrete frequency from each other. The transmitter 58 may comprise a radio frequency transmitter or the like that has an operational range of at least 100.0 feet.

An adhesive layer 60 is positioned on the first surface 54 of the disk 52 and the adhesive layer 60 adheres to the respective object 50 for retaining the disk 52 on the respective object 50. A protective sheet 62 is removably positioned over the adhesive layer 60 for protecting the adhesive layer 60. The protective sheet 62 is removed from the adhesive layer 60 prior to positioning the disk 52 on the respective object 50. A transmitting power supply 64 is positioned within the disk 52 and the transmitting power supply 64 is electrically coupled to the transmitting control circuit 56.

In use, each of the transmitting units 48 is attached to the respective object 50 that the user wishes to track. The programming buttons 26 on the housing 14 are manipulated to program the pre-determined trigger distance, the pre-determined time of day or the pre-determined routine. The user chooses to program the pre-determined trigger distance, the pre-determined time of day or the pre-determined routine based on what the user feels will be the most effective way to avoid losing the objects 50. The speaker 36 emits the audible alarm when the user moves beyond the pre-determined trigger distance from the object, when the pre-determined time of day occurs or when the pre-determined routine is accomplished. In this way the user is reminded that they are about to lose track of the objects 50, thereby facilitating the user to retrieve the object. Additionally, the vibration unit 38 is turned on at the same time the speaker 36 is turned on to alert the user with a physical sensation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A multiple object location assembly being configured to emit an audible alert when a user moves beyond a predetermined distance from one or more objects, said assembly comprising:

a tracking unit being wearable on a user, said tracking unit having a plurality of communication channels, each of said communication channels being programmable to have a distance alarm being set to a pre-determined trigger distance, each of said communication channels having a time alarm being set to a pre-determined time of day, each of said communication channels having a routine alarm being set for a pre-determined routine; and a plurality of transmitting units, each of said transmitting units broadcasting a tracking signal to said tracking unit, each of said transmitting units being coupled to a respective one of a plurality of objects wherein said tracking signal broadcast by each of said transmitting units is configured to be associated with the respective object, each of said transmitting units being assigned to a respective one of said communication channels in said tracking unit, said distance alarm in a respective one of said communication channels being turned on when said transmitter assigned to said respective communication channel moves beyond said pre-determined trigger distance from said tracking unit, said time alarm in a respective one of said communication channels being turned on at the pre-determined time of day assigned to a respective one of said transmitting units, said routine alarm in a respective one of said communication channels being turned on at the pre-determined routine assigned to a respective one of said transmitting units.

2. The assembly according to claim 1, wherein said tracking unit comprises:
a housing having a top wall;
a first strap being coupled to and extending away from said housing; and
a second strap being coupled to and extending away from said housing, said second strap being matable to said first strap such that said first strap and said second strap form a closed loop having an adjustable diameter wherein said first strap and said second strap are configured to retain said housing around the user's wrist.

3. The assembly according to claim 2, wherein said tracking unit comprises a control circuit being positioned within said housing, said control circuit receiving a distance input, a time input and a routine input.

4. The assembly according to claim 3, wherein said tracking unit comprises an electronic timer being positioned within said housing, said electronic timer being electrically coupled to said control circuit, said electronic timer tracking the time of day.

5. The assembly according to claim 4, wherein said tracking unit comprises a plurality of programming buttons, each of said programming buttons being movably coupled to said housing, each of said programming buttons being electrically coupled to said control circuit, each of said programming buttons programming a respective one of said trigger distance, said pre-determined time of day and said pre-determined routine, said control circuit receiving said time input when said electronic timer reaches a time of day that corresponds to said pre-determined time of day programmed with said respective programming button.

6. The assembly according to claim 5, wherein said tracking unit comprises a transceiver being positioned within said housing, said transceiver being electrically coupled to said control circuit, said transceiver being capable of receiving a plurality of tracking signals each being on a discrete frequency from one another.

7. The assembly according to claim 6, wherein said tracking unit comprises a signal analyzer being positioned within said housing, said signal analyzer being electrically coupled to said control circuit, said signal analyzer determining a distance over which each of said tracking signals has been broadcast to said transceiver, said control circuit receiving said distance input when said signal analyzer determines that any of said tracking signals has been broadcast over a distance that exceeds said pre-determined distance programmed by respective programming button.

8. The assembly according to claim 7, wherein said tracking unit comprises a display being coupled to said top wall of said housing such that said display is visible to a user, said display being electrically coupled to said control circuit, said display displaying indicia comprising numbers to indicate said pre-determined trigger distance programmed by said respective programming button, said indicia comprising numbers to indicate said pre-determined time of day programmed by said respective programming button, said indicia comprising letters and number to indicate said pre-determined routine programmed by said respective programming button.

9. The assembly according to claim 8, wherein said tracking unit comprises a speaker being coupled to said housing wherein said speaker is configured to emit an audible alarm outwardly therefrom, said speaker being electrically coupled to said control circuit, said speaker being turned on when said control circuit receives any of said distance input, said time input or said routine input.

10. The assembly according to claim 9, wherein said tracking unit comprises a vibration unit being coupled to said housing such that said vibration unit is in mechanical communication with said housing, said vibration unit being electrically coupled to said control circuit, said vibration unit vibrating said housing when said vibration unit is turned on wherein said vibration unit is configured to facilitate a haptic alert for the user, said vibration unit being turned on when said control circuit receives any of said distance input, said time input of said routine input.

11. The assembly according to claim 10, wherein said tracking unit comprises a power supply being coupled to said housing, said power supply being electrically coupled to said control circuit, said power supply comprising:
at least one rechargeable battery being positioned within said housing, said at least one rechargeable battery being electrically coupled to said control circuit; and
a charge port being recessed into said housing, said charge port being electrically coupled to said at least one rechargeable battery, said charge port being electrically coupled to a power source for charging said at least one rechargeable battery.

12. The assembly according to claim 6, wherein each of said transmitting units comprises a disk being positionable on the respective object, said disk having a first surface.

13. The assembly according to claim 12, wherein each of said transmitting units comprises:
a transmitting control circuit being positioned within said disk; and
a transmitter being positioned within said disk, said transmitter being electrically coupled to said transmitting control circuit, said transmitter continuously broadcasting said tracking signal to said transceiver in said tracking unit, said tracking signal broadcast by said transmitter in each of said transmitting units being broadcast on a discrete frequency from each other.

14. The assembly according to claim 13, wherein each of said transmitting units comprises an adhesive layer being positioned on said first surface of said disk wherein said adhesive layer is configured to adhere to the respective object for retaining said disk on the respective object.

15. The assembly according to claim 14, wherein each of said transmitting units comprises a protective sheet being removably positioned over said adhesive layer for protecting said adhesive layer, said protective sheet being removed from said adhesive layer prior to positioning said disk on the respective object.

16. The assembly according to claim 15, wherein each of said transmitting units comprises a transmitting power supply being positioned within said disk, said transmitting power supply being electrically coupled to said transmitting control circuit.

17. A multiple object location assembly being configured to emit an audible alert when a user moves beyond a predetermined distance from one or more objects, said assembly comprising:
   a tracking unit being wearable on a user, said tracking unit having a plurality of communication channels, each of said communication channels being programmable to have a distance alarm being set to a pre-determined trigger distance, each of said communication channels having a time alarm being set to a pre-determined time of day, each of said communication channels having a routine alarm being set for a pre-determined routine, said tracking unit comprising:
      a housing having a top wall;
      a first strap being coupled to and extending away from said housing;
      a second strap being coupled to and extending away from said housing, said second strap being matable to said first strap such that said first strap and said second strap form a closed loop having an adjustable diameter wherein said first strap and said second strap are configured to retain said housing around the user's wrist;
      a control circuit being positioned within said housing, said control circuit receiving a distance input, a time input and a routine input;
      an electronic timer being positioned within said housing, said electronic timer being electrically coupled to said control circuit, said electronic timer tracking the time of day;
      a plurality of programming buttons, each of said programming buttons being movably coupled to said housing, each of said programming buttons being electrically coupled to said control circuit, each of said programming buttons programming a respective one of said trigger distance, said pre-determined time of day and said pre-determined routine, said control circuit receiving said time input when said electronic timer reaches a time of day that corresponds to said pre-determined time of day programmed with said respective programming button;
      a transceiver being positioned within said housing, said transceiver being electrically coupled to said control circuit, said transceiver being capable of receiving a plurality of tracking signals each being on a discrete frequency from one another;
      a signal analyzer being positioned within said housing, said signal analyzer being electrically coupled to said control circuit, said signal analyzer determining a distance over which each of said tracking signals has been broadcast to said transceiver, said control circuit receiving said distance input when said signal analyzer determines that any of said tracking signals has been broadcast over a distance that exceeds said pre-determined distance programmed by respective programming button;
      a display being coupled to said top wall of said housing such that said display is visible to a user, said display being electrically coupled to said control circuit, said display displaying indicia comprising numbers to indicate said pre-determined trigger distance programmed by said respective programming button, said indicia comprising numbers to indicate said pre-determined time of day programmed by said respective programming button, said indicia comprising letters and number to indicate said pre-determined routine programmed by said respective programming button;
      a speaker being coupled to said housing wherein said speaker is configured to emit an audible alarm outwardly therefrom, said speaker being electrically coupled to said control circuit, said speaker being turned on when said control circuit receives any of said distance input, said time input or said routine input;
      a vibration unit being coupled to said housing such that said vibration unit is in mechanical communication with said housing, said vibration unit being electrically coupled to said control circuit, said vibration unit vibrating said housing when said vibration unit is turned on wherein said vibration unit is configured to facilitate a haptic alert for the user, said vibration unit being turned on when said control circuit receives any of said distance input, said time input of said routine input;
      a power supply being coupled to said housing, said power supply being electrically coupled to said control circuit, said power supply comprising:
         at least one rechargeable battery being positioned within said housing, said at least one rechargeable battery being electrically coupled to said control circuit; and
         a charge port being recessed into said housing, said charge port being electrically coupled to said at least one rechargeable battery, said charge port being electrically coupled to a power source for charging said at least one rechargeable battery; and
   a plurality of transmitting units, each of said transmitting units broadcasting a tracking signal to said tracking unit, each of said transmitting units being coupled to a respective one of a plurality of objects wherein said tracking signal broadcast by each of said transmitting units is configured to be associated with the respective object, each of said transmitting units being assigned to a respective one of said communication channels in said tracking unit, said distance alarm in a respective one of said communication channels being turned on when said transmitter assigned to said respective communication channel moves beyond said pre-determined trigger distance from said tracking unit, said time alarm in a respective one of said communication channels being turned on at the pre-determined time of day assigned to a respective one of said transmitting units, said routine alarm in a respective one of said communication channels being turned on at the pre-determined routine assigned to a respective one of said transmitting units, each of said transmitting units comprising:
      a disk being positionable on the respective object, said disk having a first surface;
      a transmitting control circuit being positioned within said disk;
      a transmitter being positioned within said disk, said transmitter being electrically coupled to said transmitting control circuit, said transmitter continuously broadcasting said tracking signal to said transceiver in said tracking unit, said tracking signal broadcast by said transmitter in each of said transmitting units being broadcast on a discrete frequency from each other;

an adhesive layer being positioned on said first surface of said disk wherein said adhesive layer is configured to adhere to the respective object for retaining said disk on the respective object;

a protective sheet being removably positioned over said adhesive layer for protecting said adhesive layer, said protective sheet being removed from said adhesive layer prior to positioning said disk on the respective object; and a transmitting power supply being positioned within said disk, said transmitting power supply being electrically coupled to said transmitting control circuit.

* * * * *